United States Patent
Ayoub et al.

(10) Patent No.: US 6,295,491 B1
(45) Date of Patent: Sep. 25, 2001

(54) METHOD OF PROVIDING DISTRIBUTED OPERATIONAL CONTROL OF A RADIO COMMUNICATION SYSTEM

(75) Inventors: Ramy P. Ayoub, Arlington Heights; Arthur L. Fumarolo, Schaumburg; John William Maher, Woodstock, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/427,514

(22) Filed: Mar. 24, 1995

(51) Int. Cl.[7] .................................................. G06F 7/00
(52) U.S. Cl. ........................... 701/33; 701/33; 707/10; 707/104; 707/200; 709/201
(58) Field of Search .......................... 395/500, 200.09, 395/200.08, 600, 615, 800, 182.04, 200.1, 182.02, 601, 612, 620, 183.19, 613, 611, 614, 616, 200.18, 200.2, 200.11, 200.02; 455/33.1, 54.1, 5.1, 53.1, 56.1, 33.2, 88, 67.1; 379/58–63; 370/310, 327, 332, 349, 360, 428, 464; 340/825.03

(56) References Cited

U.S. PATENT DOCUMENTS

| | | | |
|---|---|---|---|
| 4,663,704 | * | 5/1987 | Jones et al. ............................ 395/650 |
| 4,710,870 | * | 12/1987 | Blackwell et al. ............... 364/DIG. 1 |
| 4,714,989 | * | 12/1987 | Billings ................................. 395/700 |
| 4,926,495 | | 5/1990 | Comroe et al. .......................... 455/54 |
| 4,927,789 | * | 5/1990 | Shirley, Jr. et al. .................... 455/67 |
| 4,961,070 | | 10/1990 | Maher et al. .......................... 340/721 |
| 5,175,851 | * | 12/1992 | Johnston et al. ....................... 395/600 |
| 5,179,660 | * | 1/1993 | Devany et al. ........................ 395/600 |
| 5,212,832 | * | 5/1993 | Ness-Cohn .......................... 455/54.1 |
| 5,291,511 | * | 3/1994 | Maher et al. .......................... 370/428 |
| 5,333,318 | * | 7/1994 | Wolf ...................................... 395/600 |
| 5,341,498 | * | 8/1994 | Connor et al. ........................ 395/600 |
| 5,446,679 | * | 8/1995 | Griffin et al. .......................... 364/514 |
| 5,457,732 | * | 10/1995 | Goldberg ................................ 379/57 |
| 5,475,863 | * | 12/1995 | Simpson et al. ..................... 455/33.1 |
| 5,479,477 | * | 12/1995 | McVey et al. ........................... 379/58 |
| 5,483,465 | * | 1/1996 | Grube et al. .......................... 455/54.1 |
| 5,513,171 | * | 4/1996 | Ludwiczak et al. .................... 370/13 |
| 5,522,066 | * | 5/1996 | Lu ................................... 395/200.07 |
| 5,543,785 | * | 8/1996 | Vatt et al. ............................ 455/38.1 |
| 5,561,706 | * | 10/1996 | Fenner ............................. 395/200.09 |
| 5,581,757 | * | 12/1996 | Maxey ............................. 395/200.01 |
| 5,588,148 | * | 12/1996 | Landis et al. ......................... 395/601 |
| 5,621,721 | * | 4/1997 | Vatuone ................................. 370/16 |

\* cited by examiner

*Primary Examiner*—Jacques H. Louis-Jacques
(74) *Attorney, Agent, or Firm*—Frank M. Scutch, III (57) ABSTRACT

A radio communication system (100) has distributed operational control. Multiple autonomously operable computer workstations (120) are linked to a radio communication database (175) via a computer network (130). A local database (211), corresponding to a view of the radio communication database (175), is stored on each computer system (120). A radio system console operator interface (206) is configured according to information in the local database (211), and is operated to perform operational control of a portion of the radio communication system (100). Data consistency of the information stored in the local database (211) is automatically maintained.

11 Claims, 9 Drawing Sheets

METHOD OF PROVIDING DISTRIBUTED OPERATIONAL CONTROL OF A RADIO COMMUNICATION SYSTEM

CROSS REFERENCE TO RELATED APPLICATIONS

This application is related to U.S. patent application, Ser. No. 08/427,025 filed Apr. 24, 1995, now U.S. Pat. No. 5,710,924, entitled METHOD OF ROUTING MESSAGES WITHIN A MULTIPROCESSING SOFTWARE SYSTEM, and Ser. No. 08/772,238 file Dec. 23, 1996, now U.S. Pat. No. 05,801,690, which is a continuation of Ser. No. 427,513 filed Mar. 24, 1995, now abandoned entitled METHOD OF MANAGING TERMINATION OF A MULTI-TASKED SOFTWARE APPLICATION and assigned to Motorola, Inc.

TECHNICAL FIELD

This invention relates in general to radio communication systems and more particularly to operational control of a radio communication system.

BACKGROUND OF THE INVENTION

Many complex radio communication systems employ system consoles to provide operational control through an operator interface. In a typical approach, a computer terminal having a display interface is connected to a centralized computer system which provides support for overall radio system control. The centralized computer system interfaces with communication hardware, such as wireless transmitters and receivers, telephone interconnect switching systems, and the like, to provide integrated communication services. The system console may support a dispatch operator position through which the operator may access portions of the radio communication system, to receive incoming calls or to communicate with remotely situated subscribers. System configuration and resource information is ordinarily kept in databases on the centralized computer, and management and maintenance methods for such information is well known in the art.

With the advent of computer networks and distributed computing systems, there is an ever-increasing trend away from centralized computer architectures toward a more distributed computing environment for general computing systems. Benefits inherent in such distributed systems, include better resource distribution, the potential for less expensive computing hardware, and potential system reliability improvements. It is desirable to have a radio communication control system that takes advantage of some of the benefits inherent in distributed computing systems. Yet, there are particular problems to be solved related to the management of resource configuration information to ensure consistency and overall system integrity. Therefore, a method of providing distributed operational control of a radio communication system is needed.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

The present invention provides for distributed operational control of a radio communication system. Autonomously operable computer systems are linked, via a computer network, to a radio communication database thereby forming a radio system control apparatus. Each autonomous computer system operates from a local database, having a localized view of the radio communication database, to perform operational control of at least a portion of the radio communication system. A system console operator interface is configured according to the local database, and a communication control hardware module is appropriately configured with radio system personality profile information corresponding to the local database. As further described below, the radio system personality profile comprises control data that is programmed within the communication control hardware module, also referred to as the radio system control module, which is used to directly drive communication hardware. This profile information includes radio system characteristics and control related information, that when programmed into the communication system hardware module, allows the system console operator interface to perform operational control of at least a portion of the radio communication system. The local database maintains this personality profile in a particular format, the details of which are described below. Updates to the local database are coordinated to ensure consistency of information, and to facilitate autonomous operation of each computer system participating in the radio system control apparatus.

Figure 1:
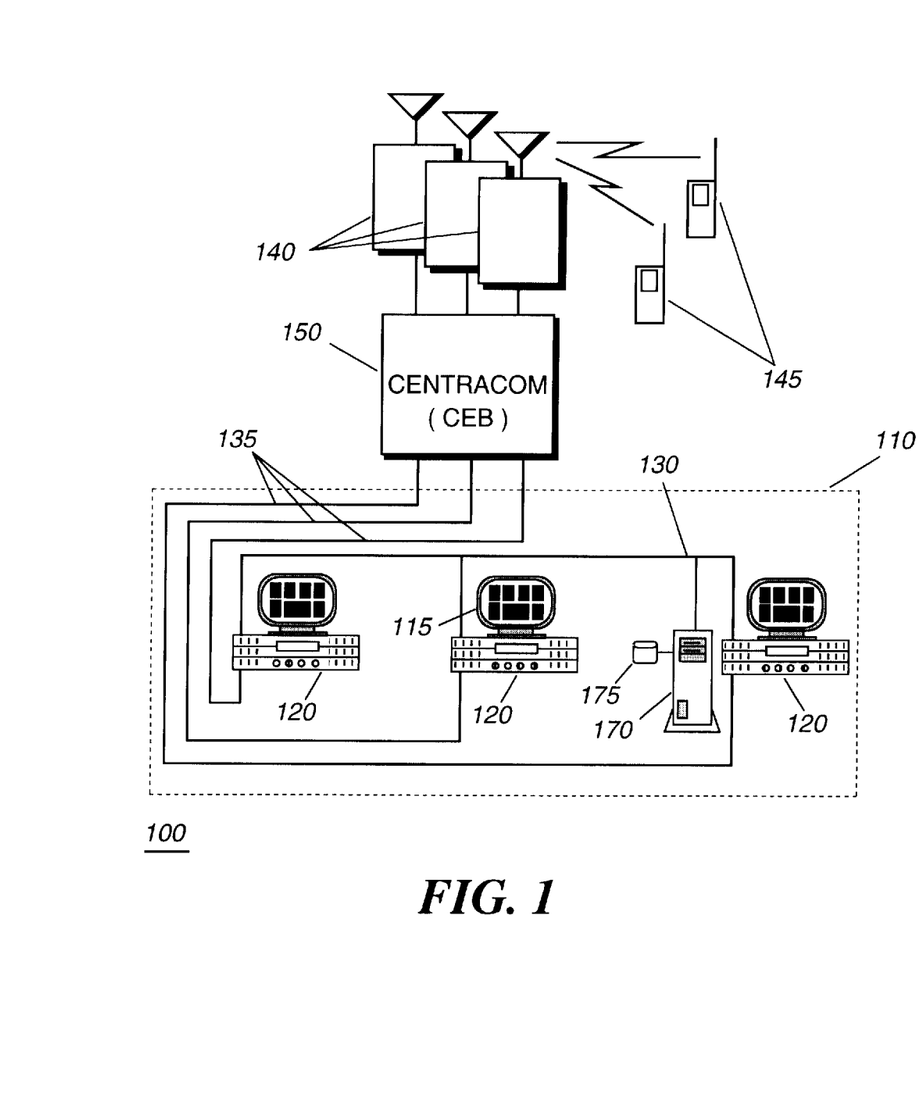
FIG. 1 shows a radio communication system, including a control apparatus implemented in a distributed computing environment, in accordance with the present invention.

Referring to FIG. 1, a block diagram of a radio communication system 100 is shown in accordance with the present invention. The communication system 100 includes wireless transceivers 140, or base stations, which are linked through a communication system interface 150 and connected via a computer network 130, to a computer system 110. The transceivers 140 interface with remotely situated wireless communication devices 145, such as portable or mobile two-way radios. The communication system interface 150 is a CENTRACOM Central Electronics Bank (CEB), described in U.S. Pat. No. 4,630,263 issued to Townsend et al. on Dec. 16, 1986, for a Time-Division Multiplex Communications Control System, and is available from Motorola, Inc. The communication system interface 150 interconnects the wireless transceivers 140 to the computer system 110 through a serial link interface 135, also referred to herein as a hardware link.

The computer system 110 supports operational control of the radio communication system 100, or a portion thereof. The computer system 110 has multiple console workstations, each providing an operator interface to the radio communication system. The computer system also includes a database server 170, accessible by each console workstation, that provides centralized access to a resource configuration database 175 for the radio communication system (hereinafter "radio communication database"). Software processes running on the console workstations interface with the database server 170 to access the radio communication database 175. In the preferred embodiment, the console workstations 120 are personal computer (PC) class computing devices, utilizing a multi-tasking operating system, such as the Microsoft® Windows NT Operating System. The console workstations 120 are preferably connected via a local area network. Accordingly, the console workstations are autonomously operable computer systems, i.e., they are independent computing devices. The computer system 110 and communication system interface 150 form a distributed control apparatus for managing the radio communication system 100.

Each console workstation 120 has output devices, such as display unit 115, and input devices (not shown) to support an operator control interface to the radio communication system 100. An operator interacts with the operator control interface via the display unit 115, and via one or more input devices, such as a keyboard, and a mouse or other pointing device. The control interface comprises multiple processes that execute on the console workstation as part of a multi-process software application (hereinafter "console software system") supporting operator assisted operational control of the radio communication system.

Figure 2:
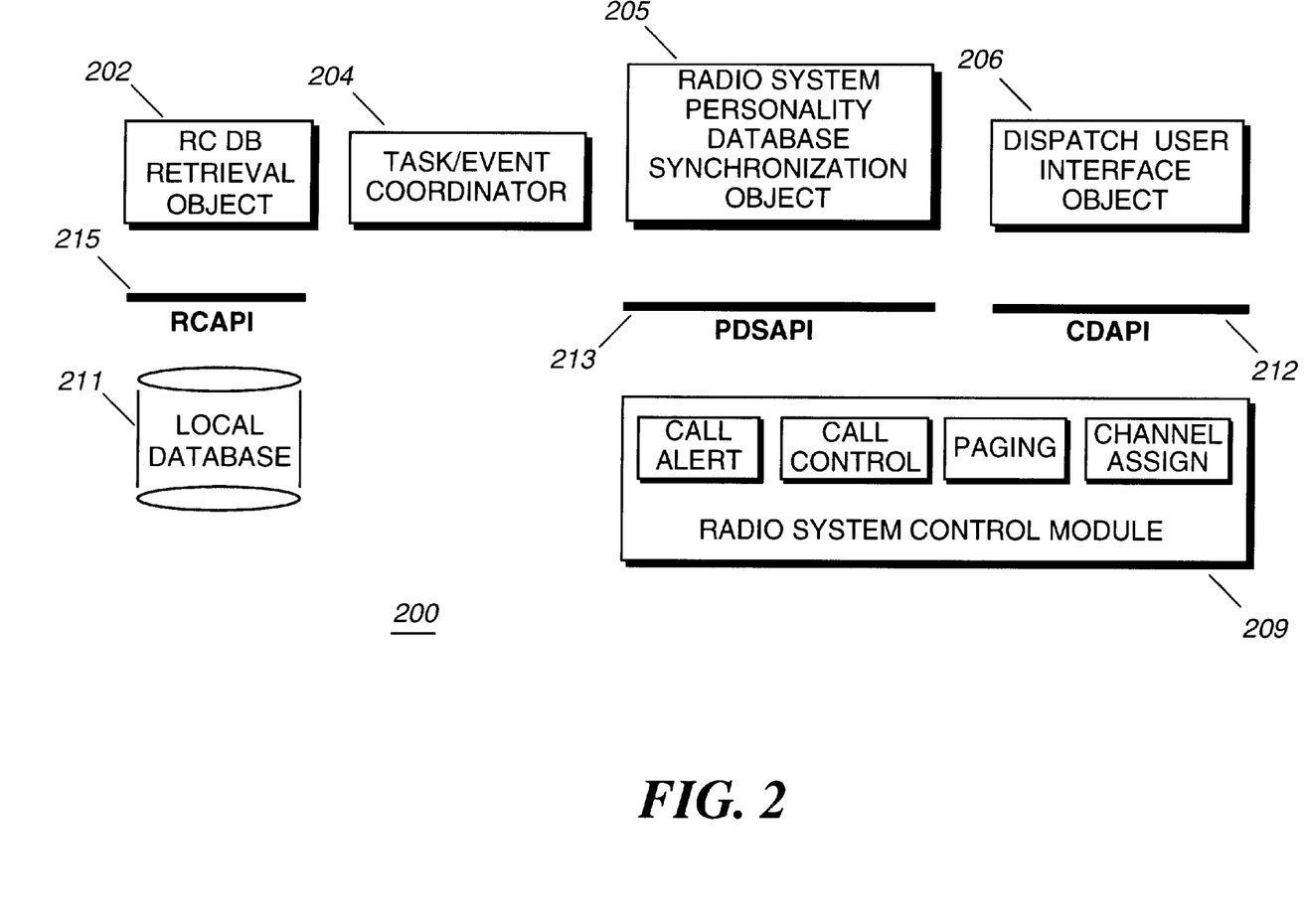
FIG. 2 is a block diagram of major components of the radio communication system control apparatus, in accordance with the present invention.

FIG. 2 is a block diagram of major components of a control apparatus 200, in accordance with the present invention. The control apparatus 200 includes hardware and software components organized in an object oriented manner. The software components are implemented primarily on the console workstation 120. Functional objects 202, 204, 205, 206 provide services using a variety of application programming interfaces 212, 213, 215 and are coordinated to provide operational control of at least a part of the radio communication system. The system objects include, among others, a resource configuration database retrieval (RCDBR) object 202, a task/event coordinator 204, a radio system personality database synchronization (RSPDS) object 205, and a dispatch interface object 206. Other operative components include a local database 211 having a localized view of the radio communication database 175, and a radio system control module 209. The objects and other components interface with each other through predefined application programming interfaces, which include a resource configuration application programming interface (RCAPI) 215, a personality database synchronization application programming interface (PDSAPI) 213, and a console dispatch interface application programming interface (CDAPI) 212. Particularly, the RCAPI 215 provides an interface with the local database 211; the PDSAPI provides an interface to the radio system control module 209 for the RSPDS object 205; and, the CDAPI 212 provides an interface to the radio system control module 209 for console dispatch interface functions.

The local database 211 represents the console workstations view that corresponds to the radio communication database 175 accessible by the database server 170. The RCDBR object 202 maintains information in the local database 211 and provides access to its contents via the RCAPI 215. Information stored in the local database 211 includes radio system characteristics, version number of the particular configuration stored, and other control related information. The database version number is used to determine if the console workstation has the latest view of the radio communication database 175 in order to determine whether the local database 211 is consistent with the information stored on the radio communication database 175, i.e., both databases are synchronized.

The RSPDS object 205 maintains synchronization of resource configuration data within the local database 211 with system information stored in the radio system control module 209. Recall that the radio system control modules are part of a communication system hardware interface, which in the preferred embodiment, comprises the central electronics bank system. The format of the data stored in the radio system control module is that of a binary large object (BLOB) a version of which is stored within the local database 211. Thus, the versions of the BLOB stored in the local database, and those stored in the radio system control module 209, must be kept consistent. Function calls for such synchronization purposes are accomplished through the PDSAPI 213. Function calls to the radio system control module 209 is handled via the CDAPI 212, and the PDSAPI 213.

The task/event coordinator 204 coordinates activities among the various objects to ensure consistent operation of the console software system. The task/event coordinator 204 monitors to detect a triggering event that potentially affects synchronization between the local database 211 and the radio communication database 175. Upon detecting such a triggering event, the task/event coordinator 204 issues a validate configuration request message to the RCDBR object 202, such that database synchronization is performed. Similarly, the task/event coordinator 204 detects triggering events that could potentially affect synchronization between the local database 211 and information stored at the radio system control module 209. When detected, the services of the RSPDS 205 object are invoked to update the radio system personality profile in the radio system control module 209 according to the local database 211 when the version information for the radio system personality profile is not consistent with information stored on the local database 211.

The dispatch user interface object 206 implements a radio system console operator interface, which is configured according to information stored in the local database 211. Dispatch and other radio system control operations are performed via the dispatch user interface object 206, and interface function calls are handled by the CDAPI 212.

According to the present invention, autonomously operable computer systems, i.e., console workstations 120, are linked via a computer network to provide distributed operational control of a radio communication system. Each console workstation 120 must be capable of operating independently even when access to centrally stored information is not available. Thus, localized versions of system resource configuration information is stored at various levels within the system, and synchronization of this information occurs when needed. Each participating console workstation may be responsible for controlling a separate portion of the radio communication system. Accordingly, localized versions of information stored in each console workstation may differ among console workstations. Consequently, version control information is stored both at the central database, accessible by the database server, and at each console workstation 120 and corresponding radio system control modules 209. Each time information at the centralized radio communication database 175 is updated, the respective version numbers are correspondingly updated. The task/event coordinator 204 may access such information to determine when to trigger a local database synchronization, and/or when to synchronize radio system personality profile stored at the radio system control module 209. Thus, the task/event coordinator operates to automatically maintain data consistency among the local database 211, the radio communication database 175, and the radio system control module 209.

In maintaining information integrity, several tasks must be performed at the console workstation 120, including: (1) detecting when the console workstation 120 does not have a local view of resource/configuration information; (2) detecting when resource/configuration information in the radio communication database 175 is inconsistent with the information stored in the local database; (3) ensuring that the radio system control module has radio system personality profile that is synchronized with the local database; (4) coordinating and operating various inputs to the system including user inputs and communication system inputs. Most of these functions are performed through the tasks/event coordinator 204 in coordination with the RCDBR object 202, the RSPDS object 205, among others.

Figure 3A:
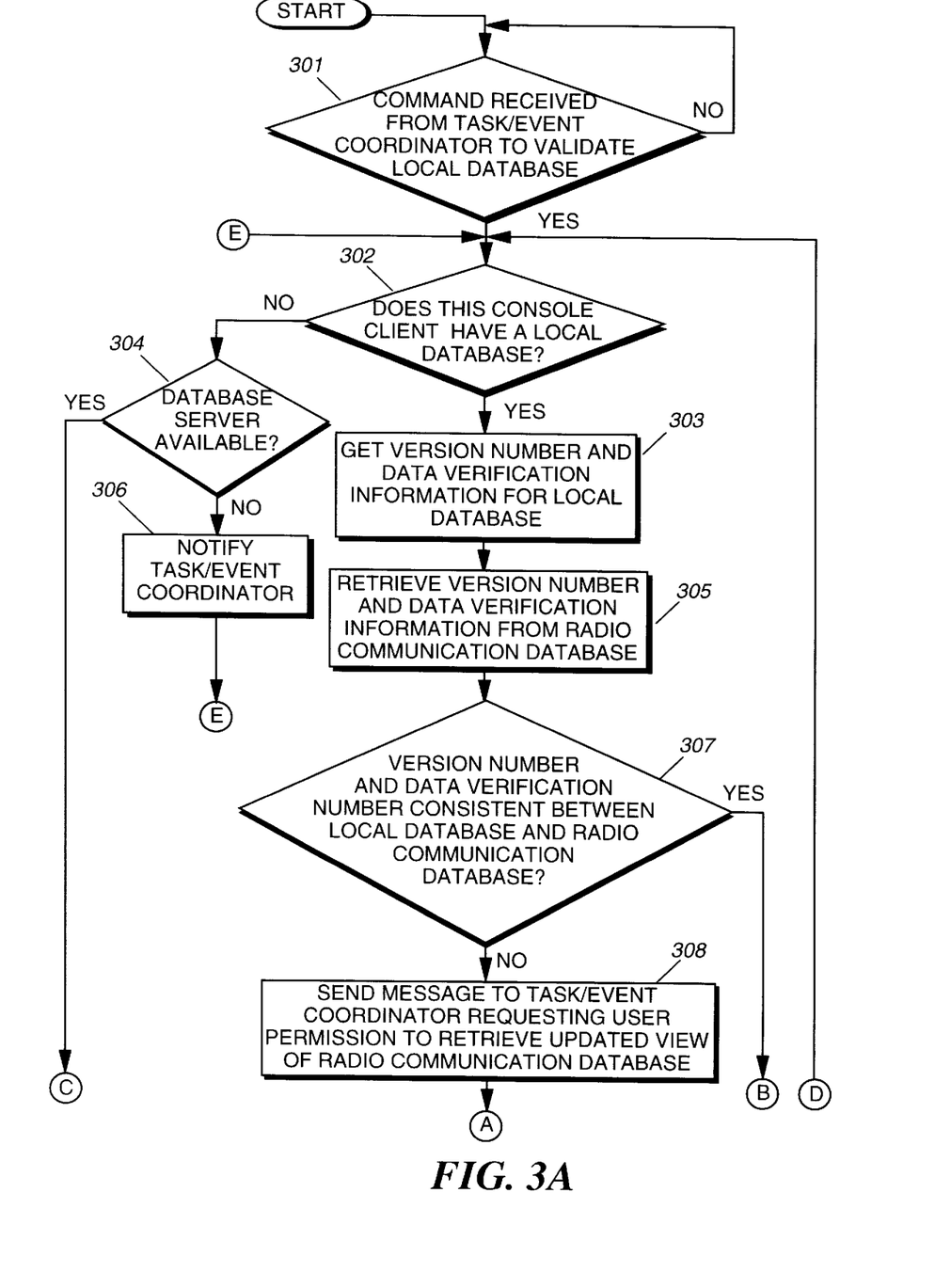
FIGS. 3A and 3B contain a flowchart of procedures used to retrieve and store a localized view of a radio communication database on a distributed console workstation, in accordance with the present invention.
Figure 3B:
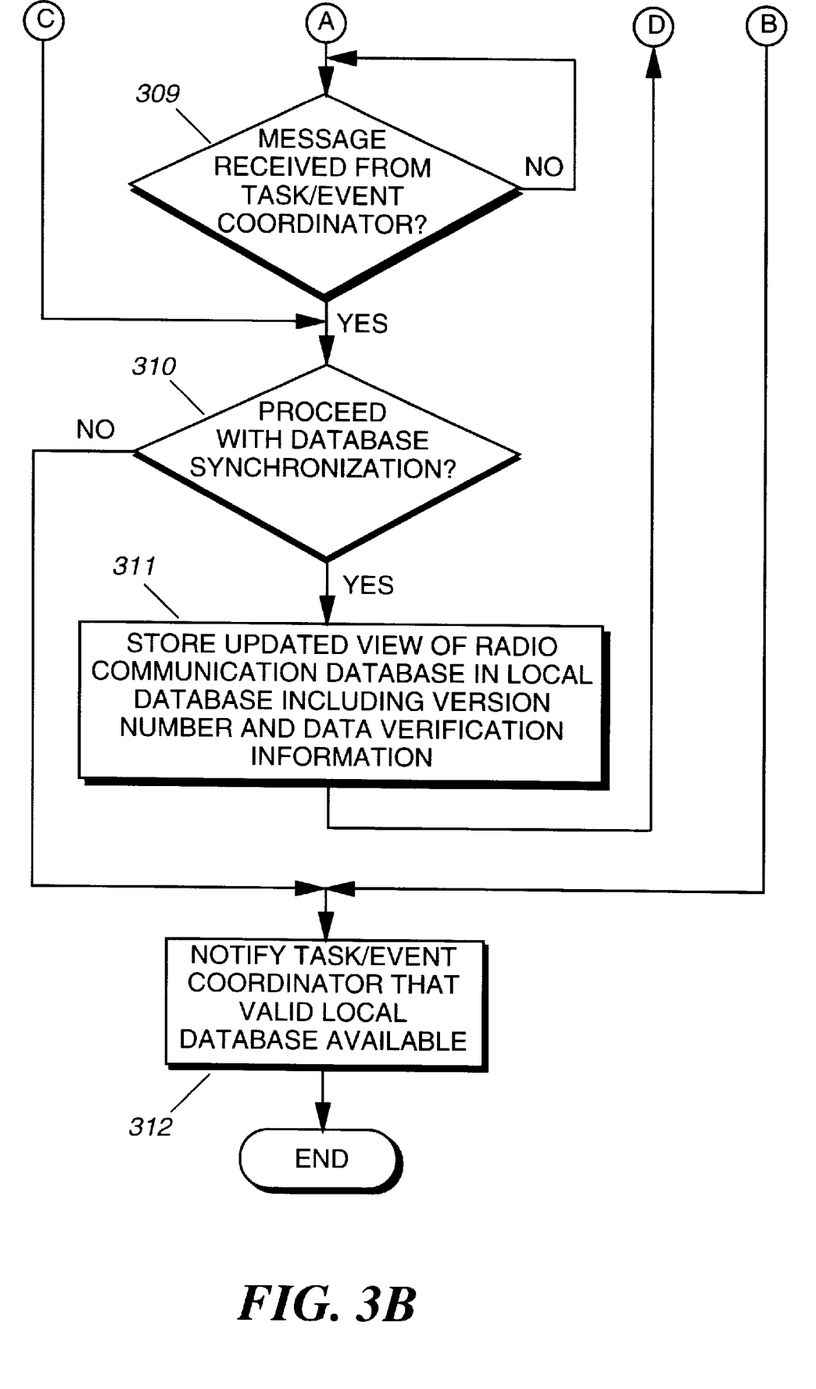
Figure 4A:
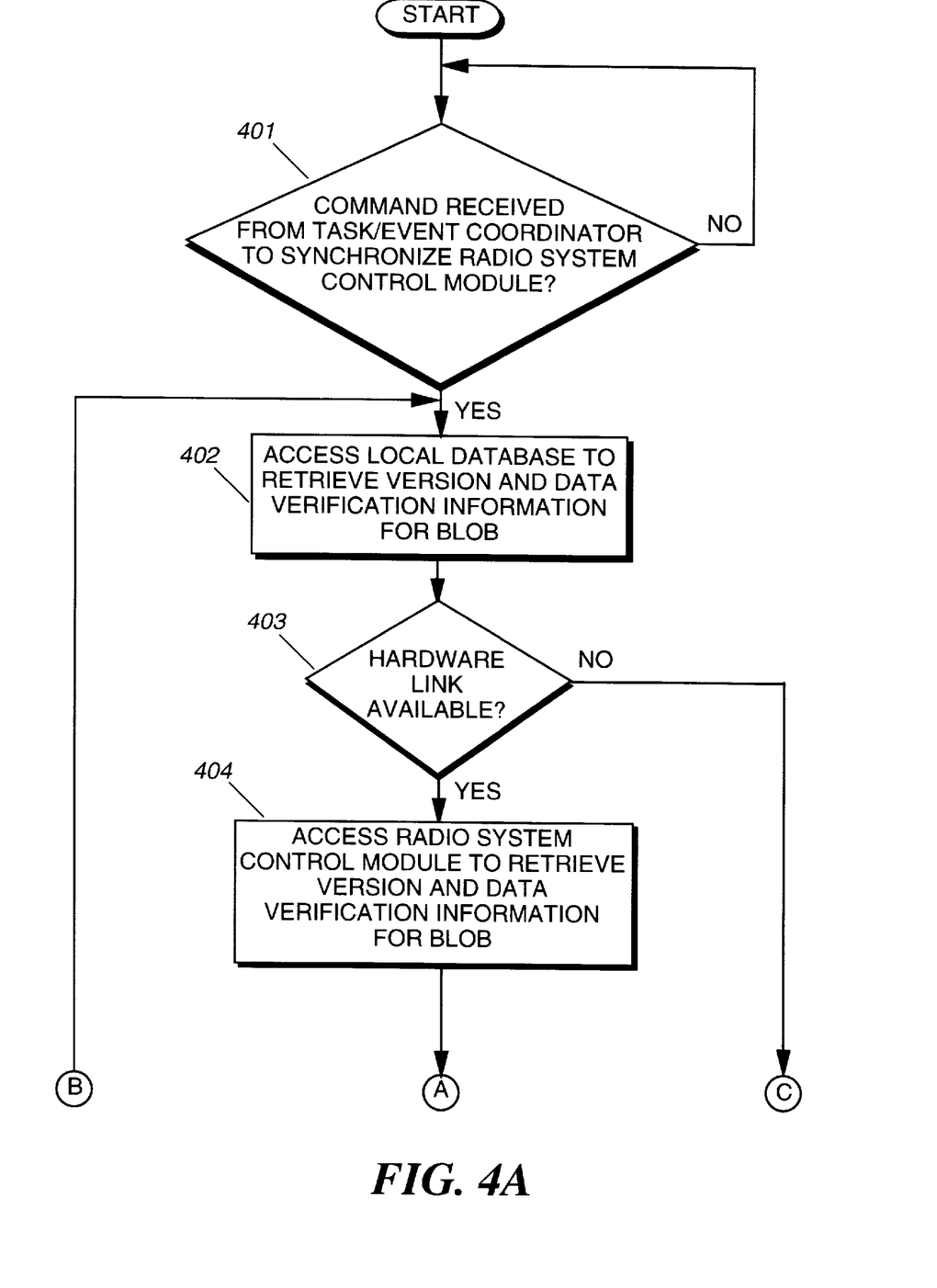
FIGS. 4A and 4B contain a flowchart of procedures used to synchronize radio system personality information in a system control module according to a localized view of the radio communication system database, in accordance with the present invention.
Figure 4B:
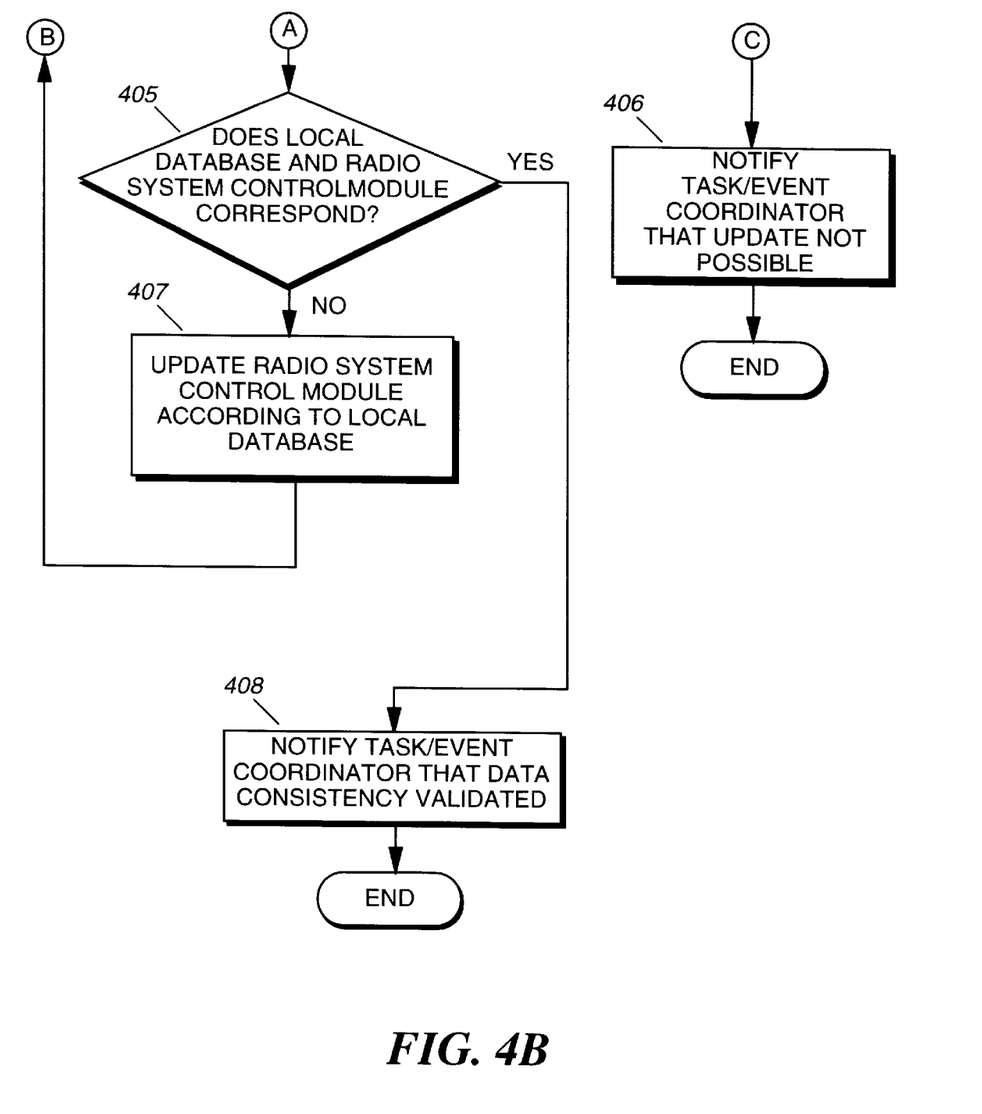
Figure 5A:
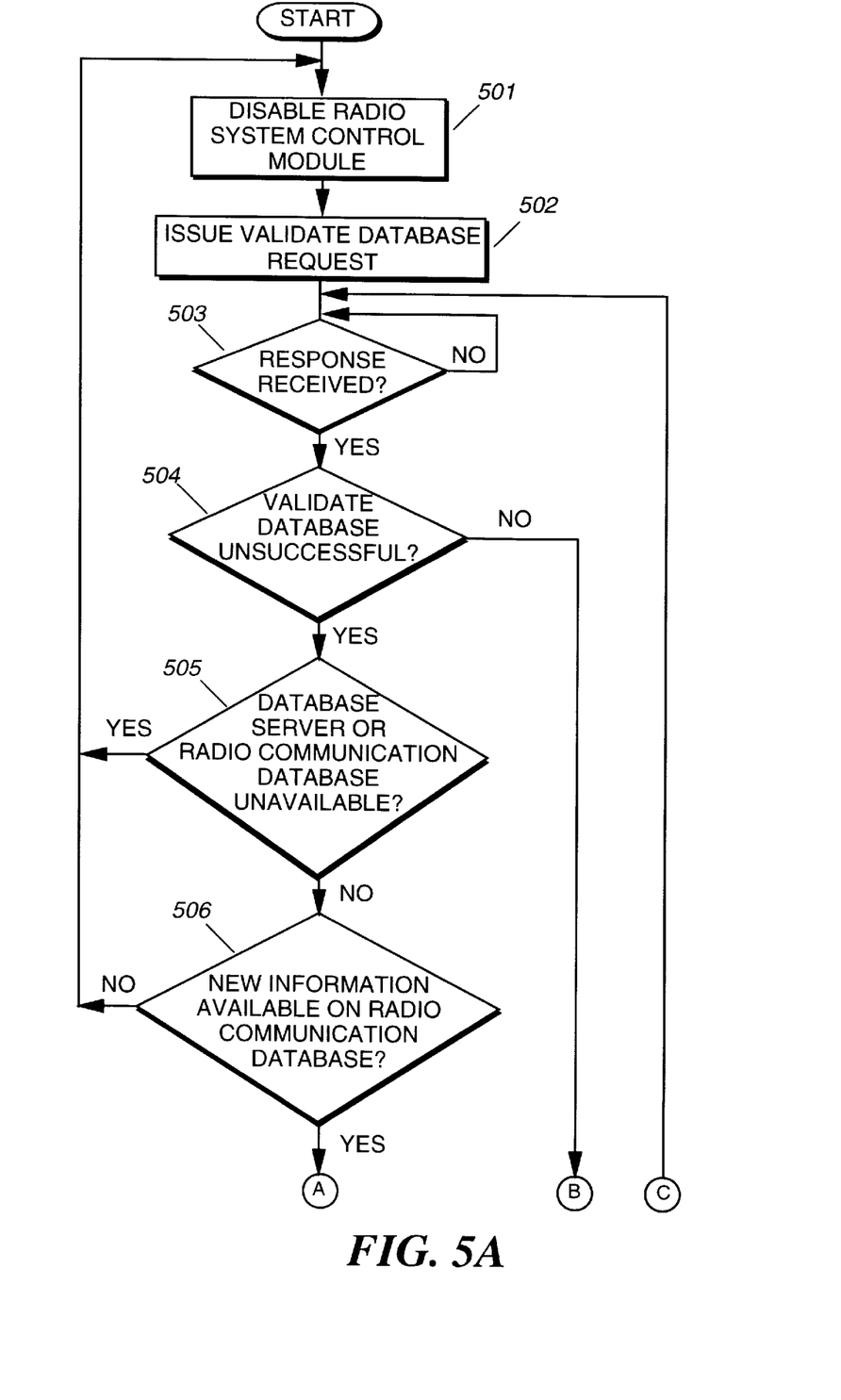
FIGS. 5A, 5B and 5C contain a flowchart of procedures for coordinating the update of localized view of the radio communication database, and the synchronization of a corresponding radio system personality stored in a control module, in accordance with the present invention.
Figure 5B:
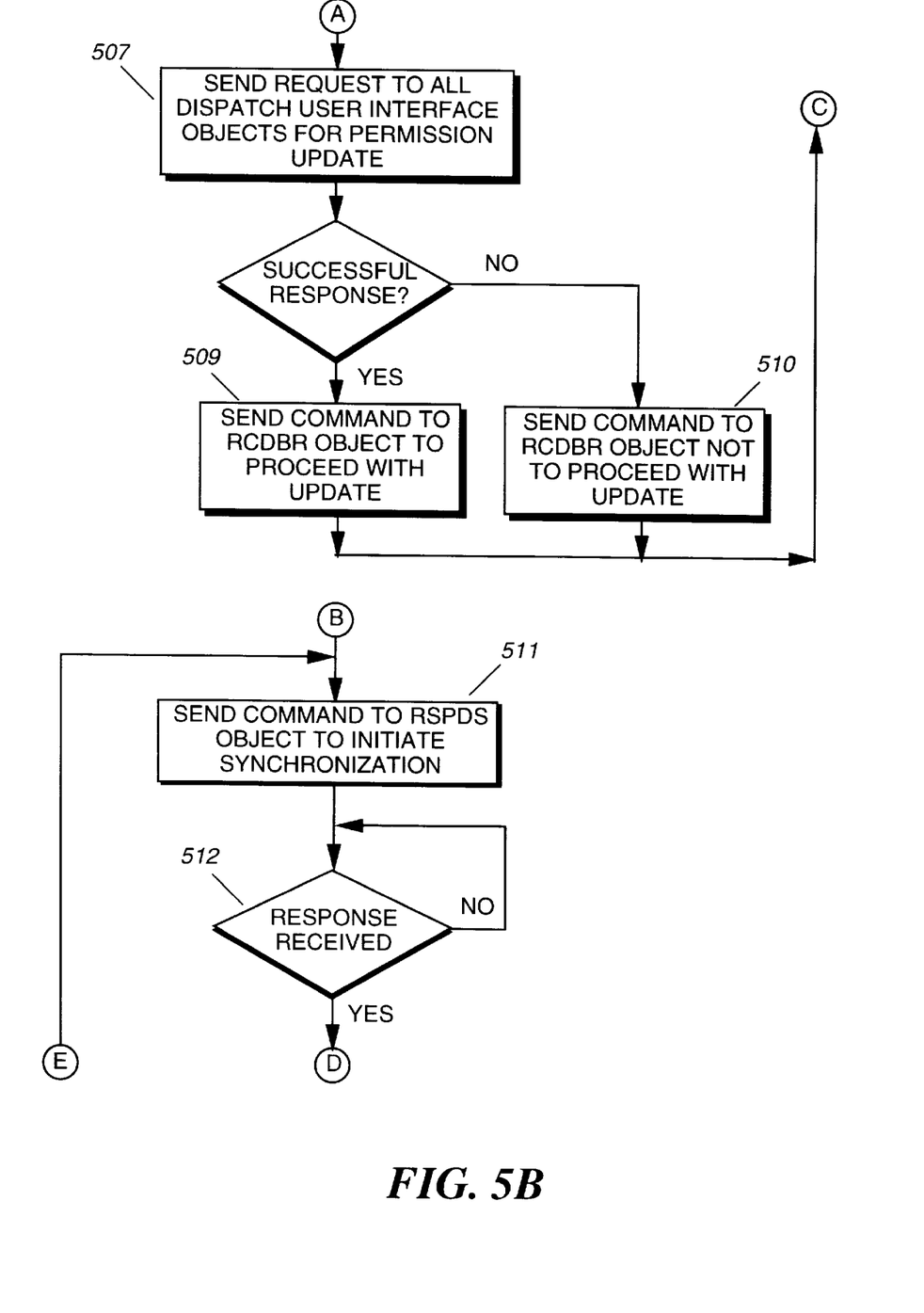
Figure 5C:
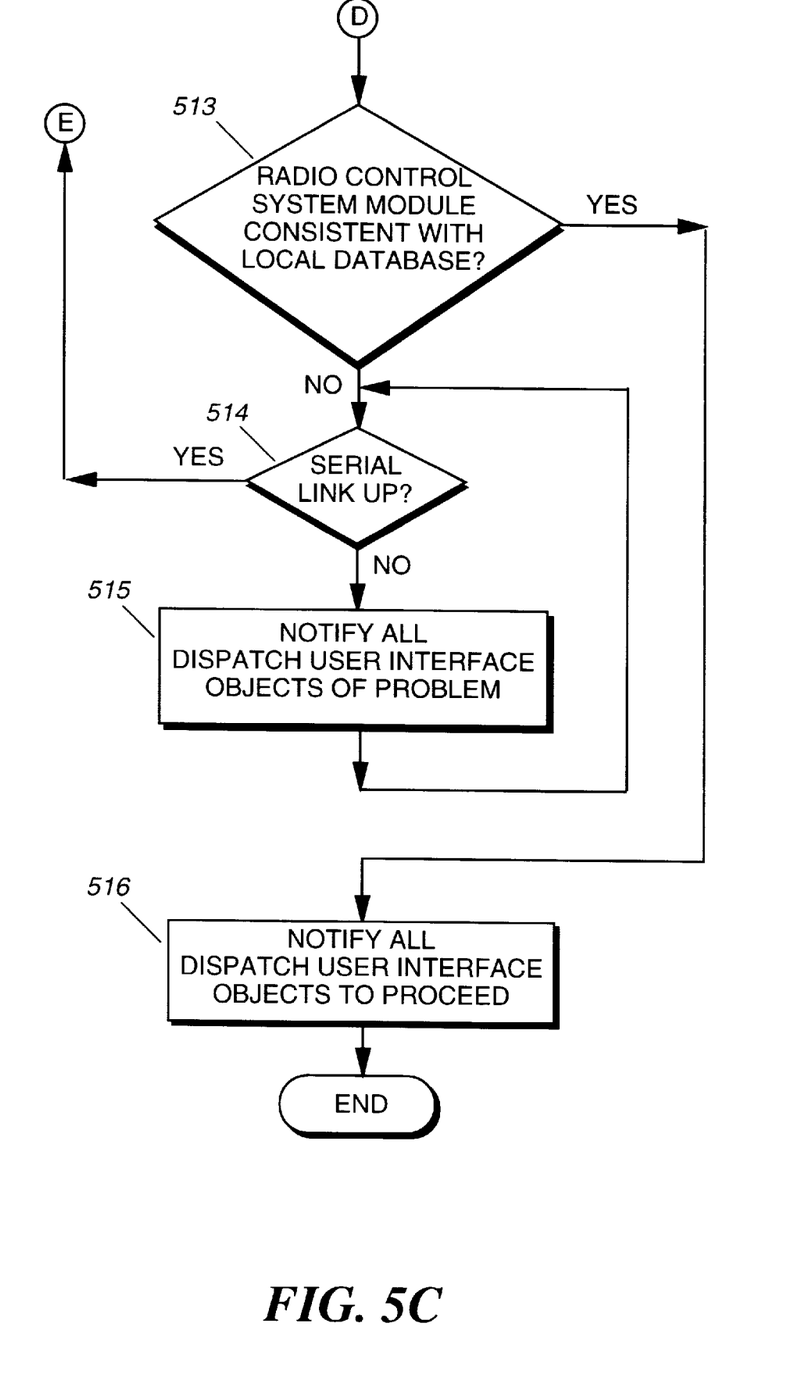

FIGS. 3A and 3B contains a flowchart of procedures used by the RCDBR object 202, in accordance with the present invention. FIGS. 4A and 4B contain a flowchart of procedures used by the radio system personality database synchronization object in accordance with the present invention. FIGS 5A, and 5B, and 5C contain a flowchart of procedures used by the task/event coordinator object, in accordance with the present invention. Referring to FIGS. 3A, 3B, 4A, 4B, 5A, 5B, and 5C the information synchronization between the radio communication database 175, the local database 211 and the information stored on the radio system control module 209, will be described.

Ordinarily, synchronization at the console workstation 120 is initiated when the task/event coordinator 204 determines that there is a potential for inconsistency between the various versions of the information stored at the radio communication database 175, the local database 211, and the radio system control module 209. The task/event coordinator 204 issues a validate database request to the RCDBR object 202 upon occurrence of such a triggering event. When a command is received from the task/event coordinator 204 to validate the local database, the RCDBR object 202 determines whether the console workstation 120 has a local database view of the radio communication database 175, steps 301, 302, and 303. If a local database view exists, information such as a version number, data verification information, and the like, is retrieved from the local database 211, steps 302, 303. The RCDBR object 202 also retrieves version number and data verification information from the radio communication database 175 for comparison purposes, step 305.

When there are inconsistencies with the version number and/or data verification information between the local database and the radio communication database 175, a message is sent to the task/event coordinator 204 requesting user input on whether to retrieve updated information from the radio communication database 175 to update the local database 211, steps 307, 308. When the task/event coordinator 204 responds with a message to proceed with database synchronization, an updated view of the radio communication database 175 corresponding to the console workstation is stored in the local database 211, including new version information and data verification information, steps 309, 310, 311. The task/event coordinator 204 is notified that a valid local view of the radio communication database 175 is available, step 312. When the RCDBR object 202 determines that it does not have a local database view of the radio communication database 175, and the database server 170 is available, a local view of the radio communication database 175 is created, steps 302, 304, 310, 311. If the database server 170 for the radio communication database 175 is not available, the task/event coordinator 204 is notified and the RCDBR object periodically polls for the database server 170 until it can access and retrieve an updated local view of the radio communication database 175, steps 302, 304, 306.

Referring to FIG. 4, the RSPDS object 205 receives a command from the task/event coordinator 204 to synchronize the radio system control module 209 with the information stored in the local database 211, step 401. The RSPDS object 205 accesses the version information stored in the local database 211 corresponding to the information stored in the radio system control module 209, step 402. The RSPDS object 205 determines whether there is a hardware link that is available to access the radio system control module 209, step 403. If a hardware link is available, the RSPDS object 205 accesses the radio system control module 209 to determine version numbers and data verification information of the stored radio system personality, step 404. When the information stored in the local database 211 corresponds with the information stored in the radio control system module 209, data consistency is validated and the task/event coordinator 204 is notified, steps 405, 408. When the radio system personality profile and other information stored in the radio system control module 209 is not consistent with information stored on the local database 211, the radio system control module 209 is updated with new information including the radio system personality according to the local database 211, steps 405, 407. In the preferred embodiment, control data programmed within the radio system control module 209. If a hardware link to the radio system control module is not available, the task/event coordinator 204 is notified that update is not possible, steps 403, 406.

Referring to FIG. 5, the procedures performed by the task/event coordinator for data synchronization purposes are described. Before data synchronization is performed, the radio system control module 209 is disabled to ensure system integrity, step 501. For example, it would be undesirable to have a user attempting to perform radio communication functions while configuration data was being updated. As mentioned earlier, the task/event coordinator 204 monitors to detect a triggering event that potentially affects synchronization between the local database 211, the radio communication database 175, and/or the information stored in the radio system control module 209. Such triggering events may include known downtime for the communication link between the console workstation 120 and the radio communication database 175, user specific inputs, system initialization, among others. Upon detecting such a triggering event, the task/event coordinator 204 issues a validation configuration request to the RCDBR object 202 with a command to validate the local database 211, step 502. The task/event coordinator 204 waits for a response from the RCDBR object 202, step 503. If the response indicates a successful update of the local database 211, a command is sent to the RSPDS object 205 to initiate synchronization between the local database 211 and the information stored in the radio system control module 209, steps 504, 511. If the update was unsuccessful because the radio communication database 175 was inaccessible, the task/event coordinator 204 periodically repeats the attempt to validate the local database, step 505. If the response to the validate request was not successful because of new information available on the radio communication database 175, a request is sent to all dispatch user interface objects 206 to solicit operator permission to update the respective local databases 211, steps 506, 507. If a response is received with permission to update the local database 211, a command is sent to the RCDBR object 202 to proceed with updating the local database 211, steps 508, 509. If permission from the dispatch user interface objects 206 was not granted, a command is sent to the RCDBR object 202 not to update the local database 211, steps 508, 510.

Upon issuing a command to the RSPDS object 205 to synchronize the radio system control module 209 with the local database 211, the task/event coordinator 204 waits for a response from the RSPDS object 205, steps 511, 512. If the response indicates that the information stored on the radio system control module 209 is now consistent with the local database, a message is sent to the dispatch user interface objects 206, and to the radio system control module 209, to accept and process regular commands, steps 513, 516. If the update of the radio system control module 209 was unsuccessful because a hardware link was not available, a notification message is sent to the dispatch user interface objects 206, steps 514, 515. The task/event coordinator 204 continues to monitor the hardware link status until the link becomes functional, at which time it will once again invoke the RSPDS object 205.

The present invention offer significant benefits over radio communication operational control systems of the prior art. By providing distributed autonomous operable computer systems capable of operational control of at least a portion of the radio communication system, a more robust radio communication control system is provided. Control of portions of the radio communication system may proceed even though other portions of the system are not available. Synchronization is coordinated between control modules directly interfacing with the communication system participants, and the localized view of radio communication information stored at the various console workstations. Procedures are provided to maintain consistency between the radio communication database, the local view stored at console workstations, and information used to directly drive communication hardware. Additional provisions are made such that critical operations are not interrupted while such updates are being made, and in some circumstances, selective control is provided to a user or operator controlling the radio communication system through one or more user interfaces.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a radio communication system, a method of providing distributed operational control comprising the steps of:

linking a plurality of autonomously operable computer systems to a radio communication database via a computer network;

at a particular computer system selected from the plurality of autonomously operable computer systems:

storing data in a local database corresponding to a view of the radio communication database;

storing, in a radio system control module, a radio system personality profile corresponding to the local database;

automatically maintaining consistency between the local database and the radio communication database;

retrieving version information for the radio system personality profile stored in the radio system control module;

updating the radio system personality profile in the radio system control module according to the local database when the version information retrieved for the radio system personality profile is not consistent with information stored on the local database;

configuring a radio system console operator interface according to the local database; and operating the radio system console operator interface to perform operational control of a portion of the radio communication system through the radio system control module.

2. In a radio communication system, a method of providing distributed operational control comprising the steps of:

linking a plurality of autonomously operable computer systems to a radio communication database via a computer network;

at a particular computer system selected from the plurality of autonomously operable computer systems:

storing data in a local database corresponding to a view of the radio communication database;

automatically maintaining consistency between the local database and the radio communication database, including the steps of:

processing, by the particular computer system, a validate configuration request message;

retrieving version information from the local database in response to the validate configuration request message; and storing an updated view of the radio communication database in the local database when the version information is not consistent with information stored on the radio communication database;

configuring a radio system console operator interface according to the local database; and operating the radio system console operator interface to perform operational control of a portion of the radio communication system.

3. The method of claim 2, further comprising the step of soliciting operator permission before storing the updated view of the radio communication database.

4. The method of claim 2, further comprising the steps of:

monitoring to detect a triggering event that potentially affects synchronization between the local database and the radio communication database; and issuing the validate configuration request message upon occurrence of the triggering event.

5. In a radio communication system having a plurality of autonomously operable computer systems linked to a radio communication database via a computer network, a method of providing distributed operational control at a particular computer system selected from the plurality of autonomously operable computer systems, the method comprising the steps of:

at the particular computer system:

storing a local database having data corresponding to a view of the radio communication database;

storing a radio system personality profile, corresponding to the local database, in a radio system control module for the radio communication system;

retrieving information for the radio system personality profile stored in the radio system control module;

updating the radio system personality profile in the radio system control module according to the local database when the information retrieved for the radio system personality profile is not consistent with information stored on the local database;

configuring a radio system console operator interface according to the local database; and operating the radio system console operator interface to perform operational control of at least a portion of the radio communication system through the radio system control module.

6. A method of providing distributed operational control a radio communication system, the method comprising the steps of:

providing a distributed control system having a plurality of autonomously operable computer systems networked to a radio communication database;

storing, by a particular computer system, data in a local database corresponding to a view of the radio communication database;

storing, in a radio system control module, a radio system personality profile corresponding to the local database;

configuring a radio system console operator interface on the particular computer system according to the local database;

operating the radio system console operator interface to perform operational control of at least a portion of the radio communication system through the radio system control module;

processing, by the particular computer system, a validate configuration request;

retrieving version information from the local database in response to the validate configuration request; and storing an updated view of the radio communication database in the local database when the version information is not consistent with information stored on the radio communication database.

7. The method of claim 6, further comprising the steps of:

retrieving version information for the radio system personality profile stored in the radio system control module; and updating the radio system personality profile in the radio system control module according to the local database when the version information for the radio system personality profile is not consistent with information stored on the local database.

8. The method of claim 6, wherein the step of providing a distributed control system comprises the steps of:

organizing the radio communication database on at least one server computer selected from the plurality of autonomously operable computer systems; and operating a database server on the at least one server computer that accesses the radio communication database.

9. The method of claim 6, further comprising the steps of:

monitoring to detect a triggering event that potentially affects synchronization between the local database and the radio communication database; and issuing the validate configuration request upon occurrence of the triggering event.

10. The method of claim 6, wherein the step of storing, in a radio system control module, a radio system personality, comprises the step of programming control data within the radio system control module.

11. The method of claim 6, wherein the step of storing, by a particular computer system, a local database, comprises the steps:

retrieving data from at least a part of the radio communication database; and forming the local database at least in part with data retrieved.

* * * * *